Oct. 29, 1929.  E. H. GOLD ET AL  1,733,791
HOSE COUPLER
Original Filed Aug. 22, 1927
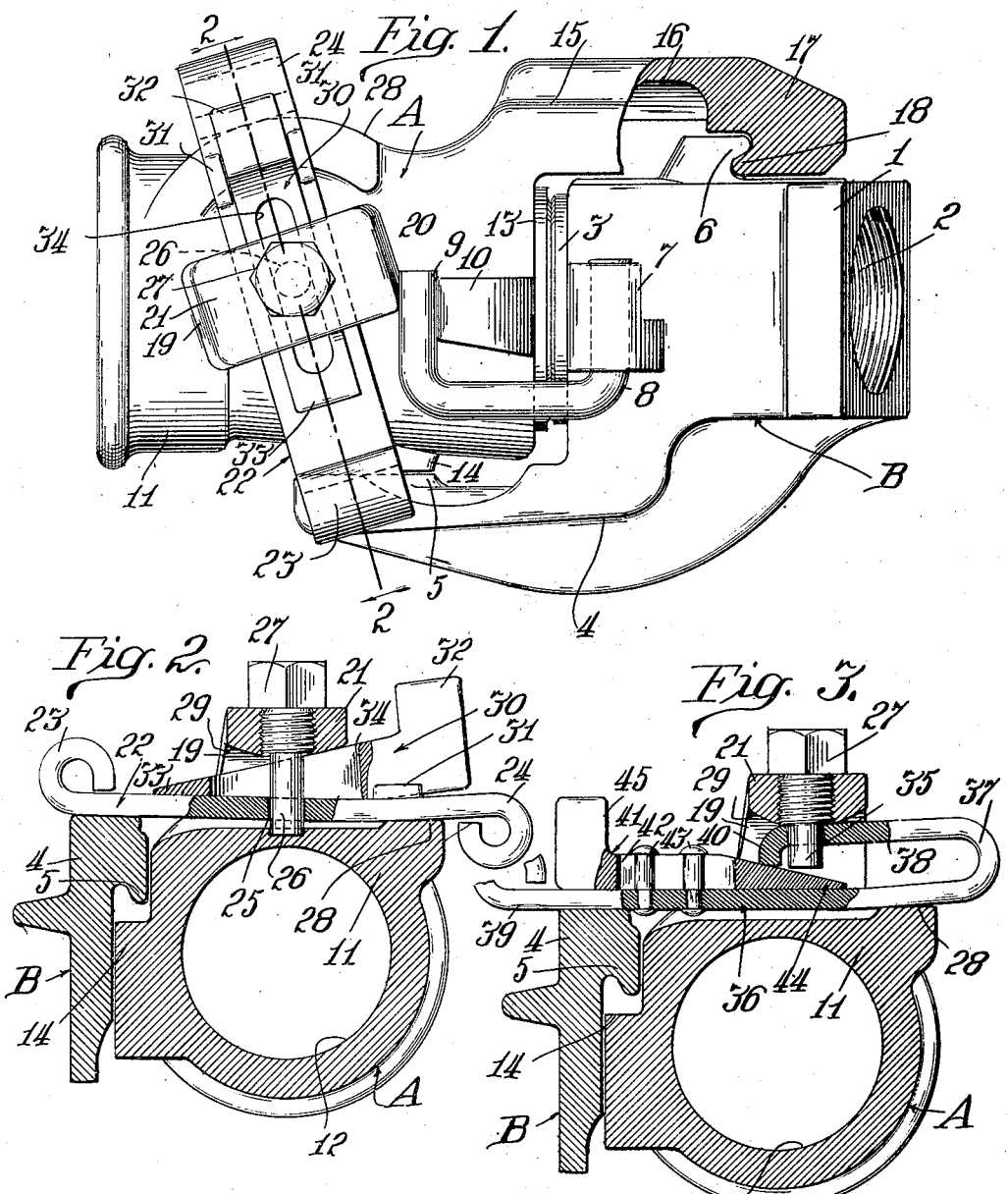
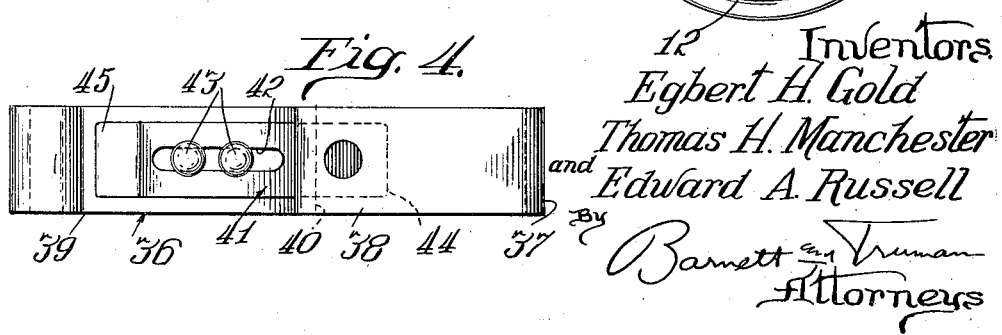
Inventors
Egbert H. Gold
Thomas H. Manchester
and Edward A. Russell
By Barnett & Truman
Attorneys Patented Oct. 29, 1929

1,733,791

UNITED STATES PATENT OFFICE

EGBERT H. GOLD, OF EVANSTON, AND THOMAS H. MANCHESTER AND EDWARD A. RUSSELL, OF CHICAGO, ILLINOIS; SAID MANCHESTER AND SAID RUSSELL ASSIGNORS TO VAPOR CAR HEATING COMPANY, INC., OF CHICAGO, ILLINOIS, A CORPORATION OF NEW YORK; MARGARET JAYNE GOLD AND BISCAYNE TRUST COMPANY, EXECUTORS OF SAID EGBERT H. GOLD, DECEASED

HOSE COUPLER

Original application filed August 22, 1927, Serial No. 214,714. Divided and this application filed December 5, 1927. Serial No. 237,775.

This invention relates to hose couplings for connecting together the hoses or equivalent flexible metallic structures on the train pipes, steam or air, of railway cars; and the object of the invention is to provide, more particularly in couplings for steam train pipe connections, new and improved means for locking together the couplers or mating members of the coupling. The present application is a division of our co-pending application Serial No. 214,714, filed August 22, 1927.

It has been customary to provide couplers with locking devices of one sort or another, which are forced with wedging pressure against the arms of the mating couplers to hold the couplers in locked relation as against the tendency to be rocked on their cams and disengaged by pull on the hoses when the train rounds a curve for example. Such positive wedge locks are effective, but the wedging pressure, especially as the locks are frequently driven into place by a hammer, is likely to injure the gaskets and also to strain or bend the coupler arms and mutilate the cams. This invention relates to a type of wedge lock which will yield so that injury to the couplers and gasket is prevented and the efficiency of the lock increased and its manipulation made easier.

One object of the invention is to provide a locking device which is first swung to locking position and simultaneously wedged yieldably into engagement with the arm of a mating coupler, in combination with an auxiliary wedging device which is subsequently forced into place to insure a more positive locking engagement.

Another object is to provide a locking device of this type comprising a plurality of wedge members, operative at different times and on different portions of the yieldable locking member.

Other objects and advantages of this invention will be more apparent from the following detailed description of certain approved forms of the apparatus.

In the accompanying drawings:

Fig. 1 is a plan view of a hose coupler constructed in accordance with this invention, and shown as mated with a coupler of known construction.

Fig. 2 is a transverse vertical section taken substantially on the line 2—2 of Fig. 1.

Fig. 3 is a view similar to Fig. 2 but showing a different form of locking member, and Fig. 4 is a plan view of the locking member shown in Fig. 3.

A hose coupler is illustrated consisting of two members or couplers A and B; coupler A being provided with a locking device involving the present invention, and the coupler B being a hose coupler of known type. The coupler of this invention is designed so that it will mate with any of the different types of so-called gravity hose couplers now in use on steam railroads in this country for making the connection between the steam train pipes on adjacent cars of railroad trains, coupler B being shown as typical or illustrative of couplers of this general class of which there are several different makes. Of course, the coupler A is also designed to mate with another coupler similar to itself.

Coupler B consists of a head 1 formed with the steam port 2, in which is arranged a gasket 3, and with a forwardly projecting arm 4 provided with an undercut lug or cam 5, and on the other side of the head from arm 4 with a cam lug 6. Projecting from the top of head 1 is a lug 7 in which is pivoted a locking link 8, the angularly disposed end 9 of which is adapted to engage with a lug 10 formed on the mating coupler member.

The improved coupler A comprises a head 11 formed with a steam port 12, a gasket 13 being suitably positioned in a gasket seat at the outer end of port 12. On one side of the coupler head 11 is the usual under-cut lug or cam 14 adapted to be engaged by the cam 5 of coupler B. The arm 15 of coupler A consists of a curved or concavo-convex web portion 16 terminating in a thickened portion 17 provided with a cam 18 for engagement with the cam 6 on the head of coupler B.

The improved locking device forming the subject-matter of the present invention is carried by the coupler A. Arranged diagonally on top of and preferably cast integral with the head 11 is a housing or bracket consisting of upright members 19 and 20 and a connecting cross member 21. The locking member 22 is preferably formed of a bar of resilient or spring metal, capable of yielding or flexing to some extent, and is preferably provided with return bent or looped end portions 23 and 24 which serve as heads to be engaged by a hammer or other tool in the process of driving the locking member from one position to another. The locking member 22 is provided with an aperture 25 at an intermediate point, adapted to fit loosely about the vertical pivot pin 26, which is preferably the downwardly projecting end of a bolt 27 screwed into the cross member 21 of the bracket. The locking bar 22 pivots for horizontal movement about the pin 26 and is also capable of a limited amount of tilting movement in a vertical plane, as hereinafter described. An arcuate cam or wedge surface 28 is formed on the upper face of head 11, concentric with the pivot pin 26. When the locking bar 22 is rotated to locking position, the end 24 of the bar will ride up over the cam or wedge surface 28 thereby tilting the bar so as to force the other end 23 downwardly into firmer engagement with the arm 4 of the mating coupler.

The under side of the cross member 21 of the bracket is formed with a curved or spherical fulcrum surface 29. A longitudinally movable wedge member 30 is slidably carried on the upper surface of locking bar 22 between a pair of upwardly projecting guide lugs 31, and is provided with a driving head 32 at its larger end. The bottom surface of the wedge member is flat and substantially horizontal to rest upon the upper surface of locking bar 22, and the upper surface of the wedge slopes downwardly to the smaller end 33. This sloping upper surface is adapted to engage beneath the curved under surface 29 of the bracket. The wedge is formed with an elongated vertical slot 34 through which pivot pin 26 projects, the pin 26 cooperating with the lugs 31 to guide the wedge member for sliding movement longitudinally of the locking bar.

When in disengaged or unlocked position, the locking member will be swung around counter-clockwise from the position shown in Fig. 1, so that the head 23 of the locking member is completely clear of the projecting arm 4 of the mating coupler. When a pair of couplers such as A and B have been brought into mating engagement with one another, by simultaneously swinging the projecting arms and cam lugs on the two members into engagement with one another in the usual manner, the locking bar 22 is swung or driven around clockwise to approximately the position shown in Figs. 1 and 2. During this movement, the wedge 30 will be driven out toward the right (Fig. 2) so that the locking member is free to swing and tilt about the pin 26 without forcibly binding against the arm 4. During this swinging movement the end 24 of the locking bar will ride up the fixed wedge 28, and the bar will fulcrum about its central pivot so that the opposite end 23 will be forced downwardly upon the arm 4 of the mating coupler B. However, this engagement will not be particularly forceful, as hereinabove noted, and furthermore the bar 22 can yield to prevent injury to any of the engaging parts. After the locking bar 22 has been swung to its locking position, with the end 23 in place above the projecting arm 4 on the mating coupler, the wedge 30 is driven in (toward the left Fig. 2) by striking the head 32 with a hammer or suitable tool. This will interpose a thicker portion of the wedge member between the bracket and the locking bar, thereby flexing the locking bar or placing it under added tension, so that a very tight engagement of the locking bar with both the wedge surface 28 and the projecting arm 4 is accomplished. The unlocking operation will be simply the reverse of the movements hereinabove described.

When a coupler of type A is coupled with a coupler of type B, as shown in Fig. 1, the locking link 8 may be swung into engagement with lug 10 after the locking bar 22 has been moved to locking position. When two similar couplers A, each equipped with this improved locking means, are coupled with one another, each of the locking devices will be driven to locking position in the manner hereinabove described. In such a combination there will be no coupler link 8, and the lugs 10 on the coupler heads will not be used, these being provided for use merely when one of the improved couplers A is connected with an old type coupler such as B. It is not absolutely essential that the locking member 22 be yieldable, and some of the advantages of this invention would be retained if a rigid locking bar were used. However, it is preferable, and a better operation is obtained and there is less likelihood of injury to any of the parts if the locking bar is formed of spring material capable of yielding to a limited extent.

A somewhat different form of the invention is illustrated in Figs. 3 and 4. The couplers A and B and the bracket 21 are the same as already described in connection with Figs. 1 and 2. The downwardly projecting end 35 of the pivot pin or bolt is shorter than in the form hereinabove described, and the spring locking member consists of a lower bar member 36 which is not directly pivoted upon pin 35 but is provided at one end with a return bent portion 37 joining with an upper arm 38 which is pivoted near its free end upon the pin 35. The return bent end 37 is adapted to ride upon the fixed arcuate cam 28 on head 11. The other free end 39 of the locking bolt is provided with a looped or return bent driving head and is adapted to engage over the upper surface of arm 4 of the mating coupler. The free end 40 of the upper short arm 38 of the locking bar, beyond the pivot pin 35, is bent downwardly but not into engagement with the lower bar 36 of the locking member, so that the entire length of this lower bar will be free to flex during the initial swinging movement of the locking member to locking position. A slidable wedge member 41 is longitudinally slotted at 42 to engage a pair of guide pins 43 secured in the lower leaf 36 of the locking member. The tapered end 44 of wedge 41 is adapted to be driven between the upper surface of the lower leaf 36 of the locking bar and the downturned end 40 of the upper leaf 38 of the spring bar. The larger end of the wedge is provided with a driving head 45 whereby it may be driven into or out of locking engagement.

As in the first described form of the invention, the locking bar is first rotated to locking position by swinging the yieldable locking bar about the pivot pin 35, and the wedge member 41 is then driven in (toward the right Fig. 3) between the upper and lower leaves of the spring bar so as to produce a further flexure of this bar or place it under added tension, thereby securing a firm locking engagement with the arm 4 of the mating coupler.

We claim:

1. A locking member for a hose coupler comprising a pivoted bar, and a wedge member mounted on the bar for movement with respect thereto.

2. A locking member for a hose coupler comprising a pivoted bar, a wedge member movable longitudinally of the bar, and guides for the wedge member on the bar.

3. A locking member for a hose coupler comprising a pivoted bar, a slidable wedge member, and guides for the wedge member on the bar.

4. A locking member for a hose coupler comprising a pivoted bar, a slidable wedge member, and means for securing the wedge member to the bar but permitting movement of the wedge longitudinally of the bar.

5. A locking member for a hose coupler comprising a pivoted spring bar which is looped back upon itself to form two spaced leaves, and a wedge member mounted on one leaf and movable between the two leaves.

6. A locking member for a hose coupler comprising a return bent spring bar consisting of a long leaf and short leaf, and a wedge member mounted on the long leaf and movable between the leaves to spring them apart.

7. A hose coupler comprising a head provided with a wedge surface and a projecting arm, a bracket on the head, a locking bar intermediately pivoted in the bracket and adapted when swung to locking position to engage at its respective ends with the wedge surface and the arm of a mating coupler, and a wedge member mounted on the bar for movement longitudinally thereof between the bar and bracket.

8. A hose coupler comprising a head provided with a wedge surface and a projecting arm, a bracket on the head, a locking bar intermediately pivoted in the bracket and adapted when swung to locking position to engage at its respective ends with the wedge surface and the arm of a mating coupler, a wedge member, and guides on the bar for permitting movement of the wedge longitudinally of the bar so that it may be forced between the bar and the bracket.

9. A hose coupler comprising a head provided with a wedge surface and a projecting arm, a bracket on the head, a resilient locking bar intermediately pivoted in the bracket and adapted when swung to locking position to yieldably engage at its respective ends with the wedge surface and the arm of a mating coupler, and a wedge member mounted on the bar for movement longitudinally thereof between the bar and bracket.

10. A hose coupler comprising a head provided with a wedge surface and a projecting arm, a bracket on the head, a resilient locking bar intermediately pivoted in the bracket and adapted when swung to locking position to yieldably engage at its respective ends with the wedge surface and the arm of a mating coupler, a wedge member, and guides on the bar for permitting movement of the wedge longitudinally of the bar so that it may be forced between the bar and the bracket.

11. A hose coupler comprising a head provided with a wedge surface and a projecting arm, a bracket on the head, a resilient return bent locking bar, the upper leaf of which is intermediately pivoted in the bracket and has its free end bent downwardly to form a lug, the return bent portion of the bar engaging the wedge surface, and the free end of the lower leaf bearing upon the arm of the mating coupler, and a movable wedge member adapted to be forced between the lug and the lower leaf of the bar.

12. A hose coupler comprising a head provided with a wedge surface and a projecting arm, a bracket on the head, a resilient return bent locking bar, the upper leaf of which is intermediately pivoted in the bracket and has its free end bent downwardly to form a lug, the return bent portion of the bar engaging the wedge surface, and the free end of the lower leaf bearing upon the arm of the mating coupler, and a wedge member slidably mounted on the lower leaf of the locking bar in position to be forced between the bar and the lug at the free end of the upper leaf.

13. In combination a hose coupler comprising a head and a projecting arm, adapted to engage, respectively, the arm and head of a mating coupler, a locking bar pivoted on the head and adapted to swing into locking engagement with the arm of a mating coupler, and wedge member carried by the car.

14. In combination a hose coupler comprising a head and a projecting arm, adapted to engage, respectively, the arm and head of a mating coupler, a locking bar mounted on the head and movable into locking engagement with the arm of a mating coupler, and a member carried by an intermediate portion of the bar and movable longitudinally thereof to force the bar into firm locking engagement with the arm.

15. In combination a hose coupler comprising a head and a projecting arm, adapted to engage, respectively, the arm and head of a mating coupler, a locking bar mounted on the head and movable into locking engagement with the arm of a mating coupler, and a movable wedge member carried by the bar and adapted to force the bar into firm locking engagement with the arm.

16. A hose coupler comprising a head provided with a wedge surface and a projecting arm, the head and arm having means adapted to engage with the arm and head respectively of a mating coupler, a bracket on the head, a yieldable locking member intermediately pivoted beneath the bracket and adapted when rotated to locking position to yieldingly engage at its respective ends the wedge surface and the arm of the mating coupler, and a movable wedge member mounted in position to be forced between the intermediate portion of the locking member and the bracket.

EGBERT H. GOLD.
EDWARD A. RUSSELL.
THOMAS H. MANCHESTER.

CERTIFICATE OF CORRECTION.

Patent No. 1,733,791.                               Granted October 29, 1929, to

EGBERT H. GOLD ET AL.

It is hereby certified that error appears in the printed specification of the above numbered patent requiring correction as follows: Page 4, line 6, claim 13, for the word "car" read "bar"; and that the said Letters Patent should be read with this correction therein that the same may conform to the record of the case in the Patent Office.

Signed and sealed this 3rd day of December, A. D. 1929.

(Seal)

M. J. Moore,
Acting Commissioner of Patents.